United States Patent
Navalon Carretero et al.

(10) Patent No.: US 6,789,530 B2
(45) Date of Patent: Sep. 14, 2004

(54) COLD START SYSTEM FOR HIGH-SPEED DIRECT-INJECTION DIESEL ENGINES

(75) Inventors: Herminio Navalon Carretero, Motilla del Palancar (ES); Francisco Payri Gonzalez, Valencia (ES); José Maria Desantes Fernandez, Valencia (ES); Jaime Alberto Broatch Jacobi, Valencia (ES)

(73) Assignee: Nagares, S.A., Universidad Politecnica de Valencia, Madrid (ES)

( * ) Notice: Subject to any disclaimer, the term of this patent is extended or adjusted under 35 U.S.C. 154(b) by 0 days.

(21) Appl. No.: 10/728,099

(22) Filed: Dec. 2, 2003

(65) Prior Publication Data

US 2004/0129258 A1 Jul. 8, 2004

Related U.S. Application Data

(63) Continuation of application No. PCT/ES01/00432, filed on Nov. 14, 2001.

(51) Int. Cl.[7] ................................................. F02G 5/00
(52) U.S. Cl. ................... 123/556; 123/549; 123/179.21
(58) Field of Search ................................. 123/549, 556, 123/179.21; 219/206, 537

(56) References Cited

U.S. PATENT DOCUMENTS

| | | | | |
|---|---|---|---|---|
| 2,177,840 A | * | 10/1939 | Roualet | 123/179.21 |
| 3,912,903 A | * | 10/1975 | Northrup et al. | 392/350 |
| 4,020,812 A | * | 5/1977 | Hayward | 123/549 |
| 5,988,146 A | * | 11/1999 | Anderson et al. | 123/549 |
| 5,992,399 A | * | 11/1999 | Anderson et al. | 123/549 |
| 6,040,557 A | * | 3/2000 | Prust et al. | 219/206 |
| 6,152,117 A | * | 11/2000 | Prust | 123/556 |
| 6,242,712 B1 | * | 6/2001 | Prust | 219/206 |
| 6,651,632 B2 | * | 11/2003 | Thimmesch et al. | 123/549 |

\* cited by examiner

Primary Examiner—M. McMahon
(74) Attorney, Agent, or Firm—Katten Muchin Zavis Rosenman

(57) ABSTRACT

Electrical resistances to carry out heating of air necessary for the combustion process of an engine, each of said resistance being in continuous tape form, with a pronounced coiled trajectory so that the resistance is distributed uniformly in an orifice for the passage of air established in a support and has its larger faces located in imaginary planes parallel to the axis of said orifice so that the electrical resistance presents its front rim to the passage of the air with a minimum loss of head, while presenting a wide contact surface to the air. The resistance is fastened to the support in arched recesses defined in diametrically opposed areas of said support, with the interposition of respective ceramic insulators being connected to ground by one of its ends and by its other end to the electricity supply cable.

2 Claims, 2 Drawing Sheets

COLD START SYSTEM FOR HIGH-SPEED DIRECT-INJECTION DIESEL ENGINES

CROSS-REFERENCE TO RELATED APPLICATION

The present application is a continuation of International Application No. PCT/ES01/00432, which was filed on Nov. 14, 2001.

OBJECT OF THE INVENTION

The present invention relates to a series of improvements introduced in the cold start system of diesel engines, whereby an optimisation is achieved of said starting in the ambit of unitary cylinder capacities of the order of 200 to 650 cubic centimetres.

The object of the invention is the development of a system for the uniform heating of the intake air flow in direct-injection diesel engines of small unitary cylinder capacity through an electrical resistance, in the form of a continuous and optimally distributed tape in the section of passage of said fluid, to achieve the starting of such engines at temperatures below −10° C. and without impairing the performance of the engine in conditions of maximum power operation as a consequence of a high head loss in the heating element.

BACKGROUND OF THE INVENTION

High-speed direct-injection diesel engines employed in motor vehicles and with unitary cylinder capacities of the order of 200 to 650 cubic centimetres, are being used massively in substitution of the divided-chamber or indirect-injection engines, mainly due to the smaller specific consumption of direct-injection engines.

Also, with relatively high supercharging pressures and due to the new concept of fuel injection systems at constant pressure, it is possible to obtain specific powers of the order of 60 kW/l, which makes that type of diesel engine very competitive when compared with petrol engines.

However, one of the main problems with diesel engines is associated with cold starting, especially in severe climates where ambient temperatures usually attain very low levels, so that to overcome said drawback or problem, high-speed direct-injection diesel engines use glow plugs (electrical resistances) located, through the head, inside the combustion chamber of the engine, to provoke the self-ignition of the fuel that is present on the surface of said spark plug which in turn initiates the engine combustion process. However, although such a solution is accepted practically universally, it in turn presents a series of drawbacks, problems and difficulties due to three fundamental concepts that can be summarized as follows:

1.—Reduced reliability, through being an element subjected to high mechanical and thermal stress.

2.—Difficulty in location, due to the use in a widespread way of the concept of four valves per cylinder in new-generation diesel engines, so that this solution leaves scant margin for manoeuvring in locating the preheating spark plugs, bearing in mind that the location should assure their interaction with the fuel jet, allow accessibility from the exterior and guarantee an adequate thermodynamic design of the head, a problem that can be augmented by the demand for greater specific powers while simultaneously reducing emission levels.

3.—Influence on the combustion process, since once its function in cold starting has been carried out, the preheating plug is an obstacle located inside the combustion chamber that hinders the process of mixing the air with the fuel, disturbing the range of air speeds and inevitably worsening engine performance, like a poor combustion process for example. Also, in diesel engines of the type described the size of the chamber is reduced and high injection pressures are employed, which leads to a greater number of injector nozzles, to assure a good fuel atomisation, which in turn leads to an improvement in the mixing process and therefore in the combustion. However, the presence of the preheating plug inside the chamber produces an unavoidable interaction with the injection jets that finally imposes a limit to all the improvements introduced in the process, as a consequence of an incomplete combustion process.

To overcome the drawbacks of cold starting in diesel engines it is possible to employ the concept of heating the intaken air by means of a heat source that can be a flame or an electrical resistance as is described in the U.S. Pat. No. 4,512,322. However, these solutions, as they have been conceived, are only possible to apply to the case of engines with unitary cylinder capacities above 800 cubic centimetres, since these engines are more adiabatic and therefore have smaller heat losses. Engines with smaller unitary cylinder capacities require more optimised systems, both from the point of view of heat energy transfer and of head losses. For this reason, it is essential in these engines to perform a uniform heating of the intake air along the entire section of fluid passage, an aspect which is inconceivable with the solution proposed in the patent mentioned, since due to the arrangement of the heating element, the heating would only be achieved in a very small portion of air concentrated in the central area, there still remaining around this an important quantity of air at a very low temperature, which means a very low thermal efficiency in achieving appropriate air temperatures for cold starting in motor vehicle engines. Moreover, the direct drawback associated with a heater distributed over the orifice section of the fluid passage relates to the loss of pressure produced, which in small engines constitutes a critical aspect regarding their performance at high running speeds. This demands a hydro-dynamic design of the heater that is far removed from that proposed in the U.S. Pat. No. 4,685,437, a solution conceived with the goal of achieving more uniform air temperatures than with the above-commented solution (U.S. Pat. No. 4,512,322) but with unacceptable values of head loss in small engines under operating conditions different to cold starting.

In the Spanish Patent of Invention 9900616 a diesel engine cold starting system is foreseen also based on performing a preheating of the orifice intake air load, said preheating of the air being carried out before the latter reaches the combustion chamber of the cylinders of the engine. The electrical resistance or resistances are arranged before the intake manifold and/or preceding the intake valves of the engine, so that when the heating energy losses through the walls of the manifold are low, either because the corresponding intake manifold is of a material with low thermal conductivity or for other reasons, generally a single electrical resistance (7) is fitted for the preheating, which is located at the inlet of said manifold, whilst if the losses through the walls are high, for example because the manifold is of a material with high thermal conductivity, a series of electrical resistances are fitted immediately before the inlet of each of the cylinders of the engine.

DESCRIPTION OF THE INVENTION

The improvements object of the present certificate of addition, applicable to the Patent of Invention 9900616 mentioned in the last paragraph of the previous section, supposes a higher functional efficiency of said system, by achieving less resistance to the passage of the air, which implies a smaller head loss, and a greater contact surface between the heating element and the air, which improves the heat transfer.

For this reason and in a more specific manner the improvements of the invention consist essentially in the use as heating medium of an electrical resistance in tape form, optimally distributed over the section of fluid passage and in the direction of the flow, whereby a uniform temperature of the air charge is achieved that the cylinder breathes adequate for starting the engine at low temperatures, as well as perfectly acceptable levels of head loss for the engine under other operating conditions.

It has also been foreseen that the support for fastening the tape resistance to the engine incorporates in diametrically opposed areas of the external mouth of the orifice for the passage of air to the engine, individual groups of recesses of approximately semicircular configuration, with a nipple inside, defining grooves having an arched trajectory in which are mounted and fastened the inflections of the laminar resistance, with the interposition of respective ceramic insulators, there also being two special slots, one blank and lacking an insulator for fastening the corresponding end of the resistance to the support itself, as a connection to ground, through a setscrew, with a rivet or the like, and another open to the exterior, accompanied by a ceramic insulator and provided to house the other end of the resistance, that which is connected to the electricity supply cable.

The special arrangement and configuration of the electrical resistance, means this offers its profile to the air passage, so that the obstructing surface of this resistance is minimum and consequently minimum also the resistance to the passage of air, which implies a remarkable decrease in the head loss. At the same time a greater contact surface is achieved with the air, since for a same section in the resistance, the external surface is considerably greater in the case of a laminate of reduced thickness than in the case of the classic resistances of circular section, which signifies a greater transfer of heat.

The form of the housings for the resistance guarantees the reliability of the heater, since its correct fastening is assured and the resistance suffering modifications in its original geometry produced by thermal dilation is avoided. These thermal dilations of the resistance are absorbed by the arched lodging channels present in the insulating supports that in turn isolate the electrical resistance from the body of the heater.

The employment of an electrical resistance in tape form provides the advantage that the heater is more robust with respect to the mechanical vibrations to which it can be subjected, which can become very intense depending on the operating conditions of the engines, whereby complete protection is also assured of the engine cylinders that could be damaged in the event of detachment of the resistance or part thereof due to breakage.

The electrical resistances in tape form have better mechanical properties, which makes it possible to obtain a system with relatively low thermal inertia due to the geometry and the total mass thereof, which in turn offers a better control of their thermal state even under non-stationary conditions of flow, as for example happens with the intake air flow in the alternative internal combustion engines.

The noticeably coiled arrangement of the heating resistance or element determines a uniform distribution of the heat in the air intake section, whereby uniform heating thereof is achieved.

Apart from this the resistance can be housed in a body external to the intake manifold, specifically in the aforementioned support, or it can be housed in the intake gasket itself, specifically in the case of having to locate a heater before each intake pipe, it being equally possible for the resistances to be housed in the intake manifold itself, either in the inlet, when there is a single heater, and/or in the outlet when there is a heater for each cylinder.

DESCRIPTION OF THE DRAWINGS

To complete the description that is being made and with the object of assisting in a better understanding of the characteristics of the invention, in accordance with a preferred example of practical embodiment thereof, as an integral part of this description, it is accompanied by a set of drawings wherein, by way of illustration and not restrictively, the following has been represented.

PREFERRED EMBODIMENT OF THE INVENTION

Figure 1:
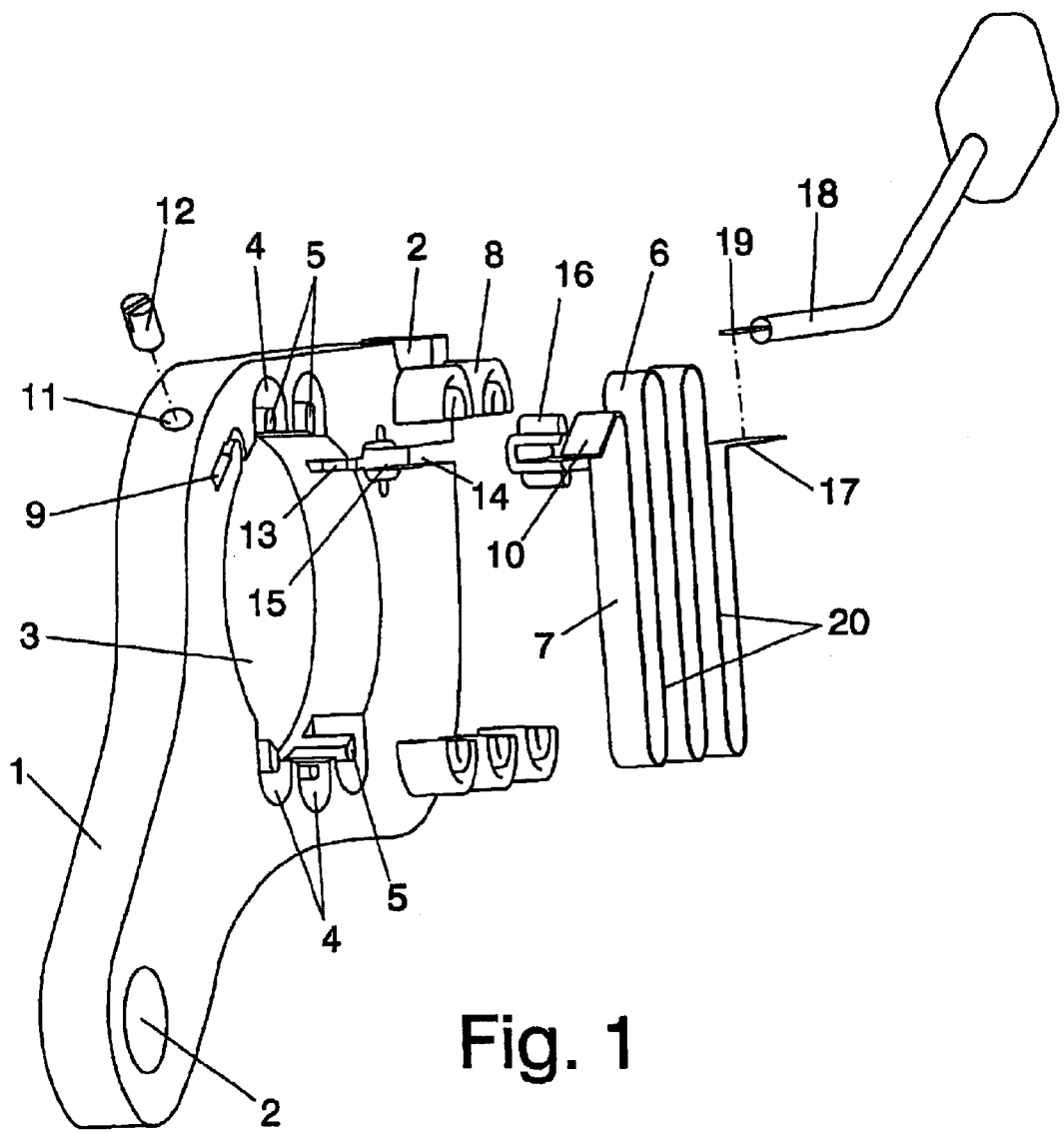
FIG. 1 shows an exploded view in perspective of a heating resistance, with its fittings, in the case that said resistance is mounted on a support adapted thereto.

In the example of practical embodiment of FIG. 1, in which the system is mounted as a body external to the intake manifold, wherein a support (1) forms part provided with orifices (2) for assembly thereof on the engine and having a wide orifice (3) for the passage of the air, being established in diametrically opposed areas of said orifice (3) and on the support (1) itself, individual groups of recesses (4), of approximately semicircular configuration, noticeably arched, inside which a nipple (5) is established defining with the mouth (4) itself, a channel of arched trajectory for accommodating the corresponding inflection (6) of an electrical resistance (7) of laminar configuration, in the form of continuous tape of markedly coiled trajectory, laminar resistance that fits in the mentioned channels defined by the recesses (4) and the nipples (5), with interposition of ceramic insulators (8) that prevent contact between the resistance (7) and the metallic material that constitutes the support (1).

With the recesses (4) mentioned above two special recesses collaborate, an outermost blank recess (9) for one of the ends (10) of the resistance (7), through which the contact to ground is made, so that this recess (9) lacks the ceramic insulator and toward which opens a threaded orifice (11) for installation of a setscrew (12) that assures a good contact to ground, it being possible notwithstanding that said setscrew (12) be substituted by a rivet or by any other appropriate means of fastening. A second special recess (13) opens to the exterior (14) of the support (1) and has an intermediate expansion (15) for locating a specific ceramic insulator (16), so that inside said ceramic insulator or in its vicinity the connection is established between the other extremity (17) of the resistance (7) and the electricity supply cable (18), properly sheathed, finished in a flat platelet (19) that is fastened by welding to the mentioned end (17) of the resistance.

In accordance with this construction the assembly of the resistance (7), after being connected to the supply cable (18), is carried out by simple lateral embedding in the support (1), after coupling the ceramic insulators (8), either to the recesses (4) of the support (1) or to the inflections (6) of the resistance (7), the assembly being definitively fastened and connected to ground by tightening the setscrew (12), so that the diverse planes defined in the corresponding lengths of the resistance (13) adopt a layout perfectly parallel to the direction of the air through the orifice (3) and, in consequence, they do not offer more resistance to this stream of air than that defined by their very thin front rims (20), whereby the head loss is minimum, practically negligible, at the same time as the trajectory of said resistance (7) is distributed in a considerably uniform manner inside the orifice (3), which determines in turn that the heating of the air is also uniform.

Figure 2:
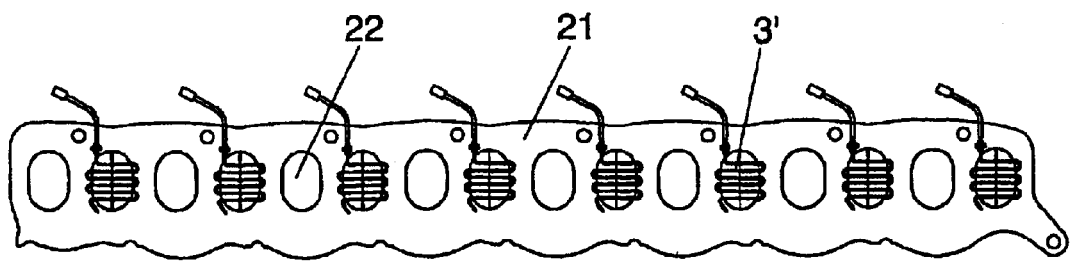
FIG. 2 shows a schematic representation of a gasket between the head and the intake and exhaust manifolds with an example of practical embodiment in which the respective resistances are mounted in the orifices of the gasket corresponding to the intake manifold.

As an alternative to mounting the heating resistance (7) or each heating resistance, on a body external to the intake manifold, the practical embodiment has been foreseen as shown in FIG. 2 wherein the resistances (7) are housed in the intake gasket (21) itself, of special interest in the case of having to locate a heater prior to each intake pipe, in which figure the intake orifices (3') appear alternating with the exhaust orifices (22).

Figure 3A:
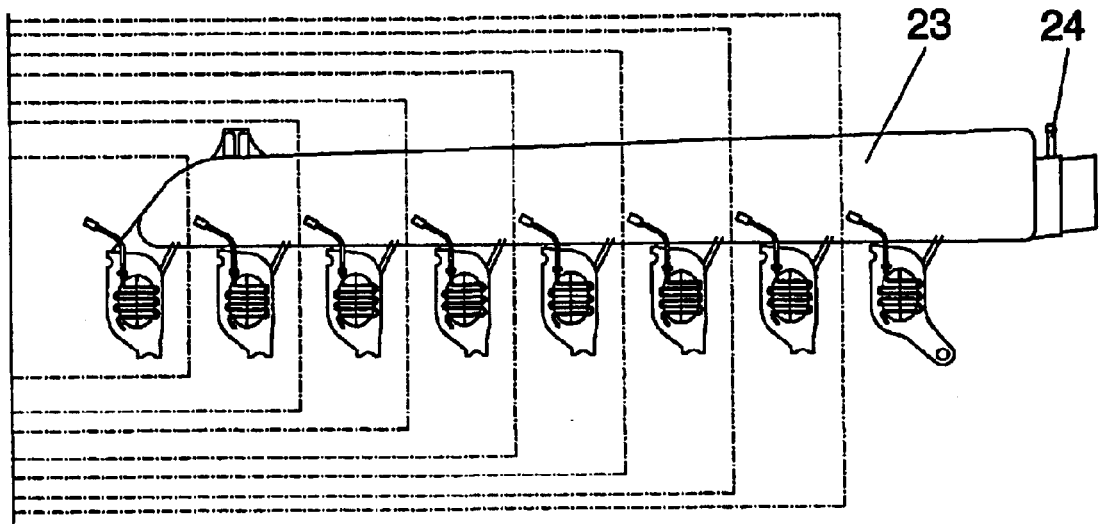
FIG. 3 shows, finally, two representations similar to that of the previous figure, but in accordance with a practical embodiment in which the heating resistances are mounted in the intake manifold itself, according to two different types of manifold.
Figure 3B:
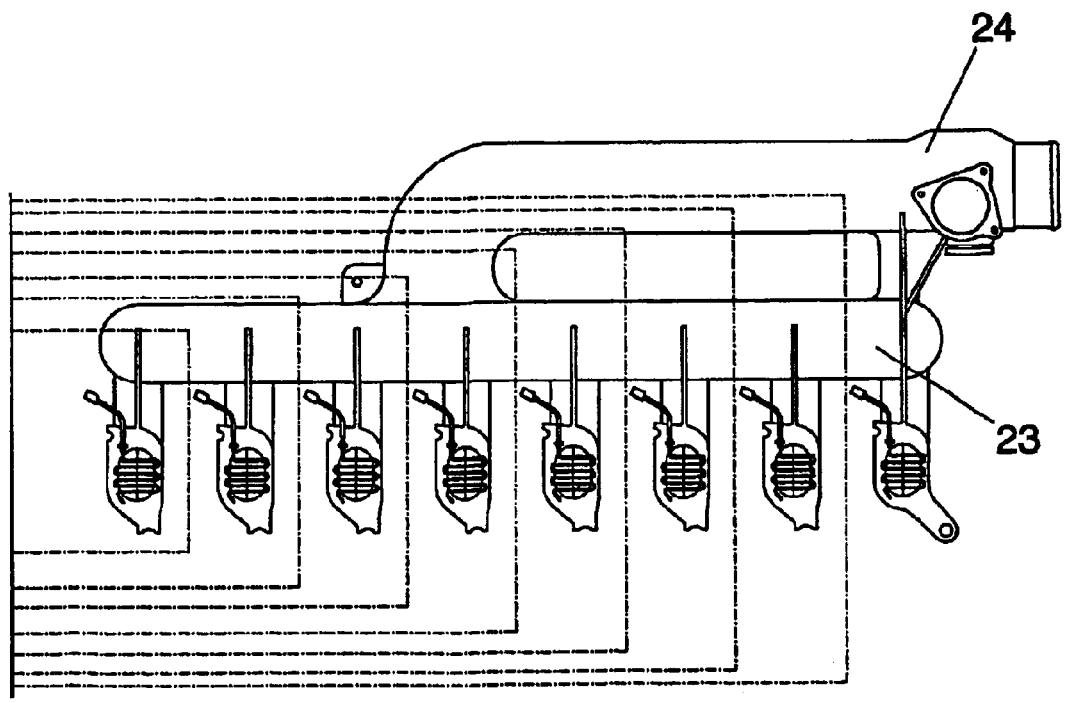

The heating resistances or elements (7) can also be located in the intake manifold (23) itself, as is shown in FIG. 3, there being either a single heater, located in the inlet (24), and/or a heating device for each cylinder, as has been shown in this figure, wherein the embodiments A and B correspond to two different types of manifold.

What is claimed is:

1. Cold starting system for high-speed direct-injection diesel engines specially conceived for motor vehicle engines based on the use of electrical resistances, and more specifically in the use of heating elements in the form of a ribbon and serpentine shaped with uniform spacing between the loops of serpentine, where the faces of the ribbon are parallel to the intake conduit axis for the passage of air to the engine so that the edges of said ribbon are perpendicular to the direction of air flow, characterised in that the resistance (7) is mounted on a support (1) provided with means of fastening to the engine, groups of recesses being established in diametrically opposed areas of the orifice (3) for the passage of air through said orifice (1) groups of recesses (4) of arched semicircular configuration, with an interior nipple (5) defining an arched recess wherein the corresponding inflection (6) of the resistance (7) is coupled with interposition of a ceramic insulator (8).

2. Cold starting system for high-speed direct-injection diesel engines according to claim 1, characterised in that in one of the groups of recesses (4) of the support (1) two special and outermost recesses are established, one recess (9), blank, that houses in its interior the corresponding extremity (10) of the resistance (7) and that, through the absence of ceramic insulator, establishes the connection to ground of this resistance with the collaboration of a setscrew (12), a rivet or the like, and the other (13), open to the exterior (14), with an intermediate expansion (15) in which a ceramic insulator (16) is established that protects the connection, by means of welding, of the other end (17) of the resistance to the end (19) of the electricity supply cable (18) thereof.

* * * * *

UNITED STATES PATENT AND TRADEMARK OFFICE
CERTIFICATE OF CORRECTION

PATENT NO.    : 6,789,530 B2
DATED         : September 14, 2004
INVENTOR(S)   : H. Navalon Carretero It is certified that error appears in the above-identified patent and that said Letters Patent is hereby corrected as shown below:

Title page,
Insert Item -- [30]    Foreign Application Priority Data,
         June 4, 2001 (SPAIN) ........................... CA200101286 --

Signed and Sealed this

Nineteenth Day of April, 2005

JON W. DUDAS
*Director of the United States Patent and Trademark Office*